Dec. 8, 1970   P. L. HARDEN ET AL   3,546,673
ELECTROMAGNETIC COUNTING APPARATUS
Filed Dec. 30, 1968   6 Sheets-Sheet 1

INVENTORS
PHILLIP L. HARDEN
SAMUEL M. THOMAS JR.

by Hood, Gust, Irish & Lundy
Attorneys

INVENTORS
PHILLIP L. HARDEN
SAMUEL M. THOMAS JR.

by Hood, Gust, Irish & Lundy
Attorneys

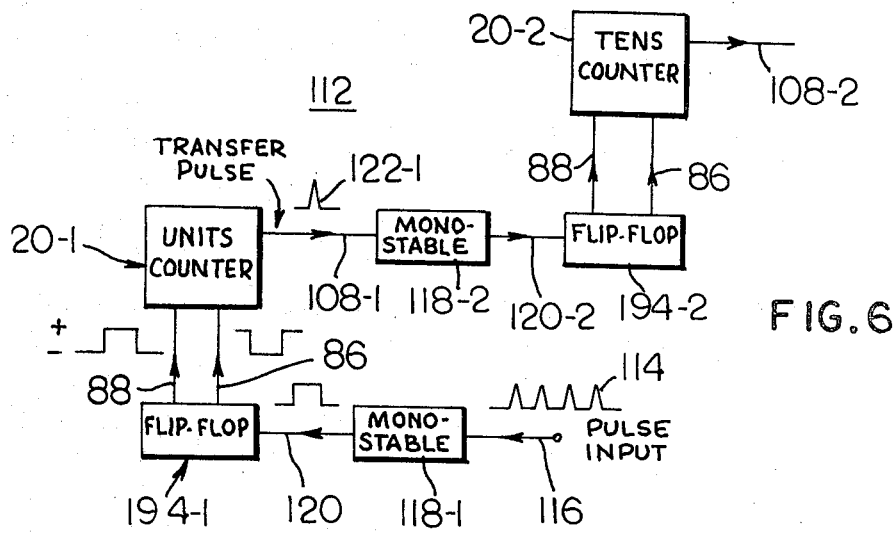
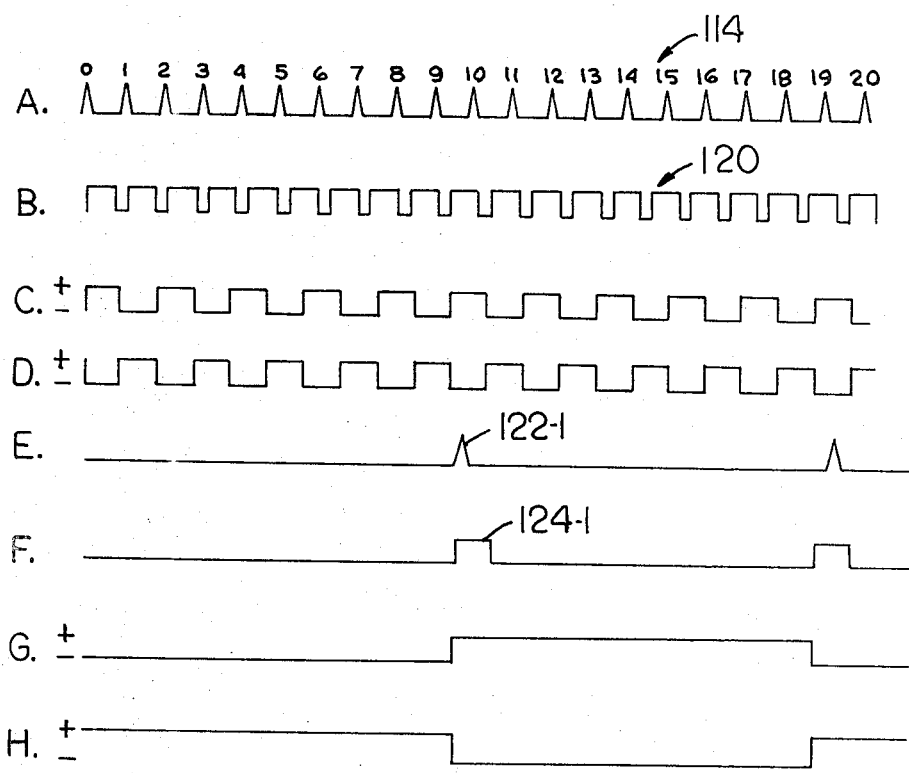

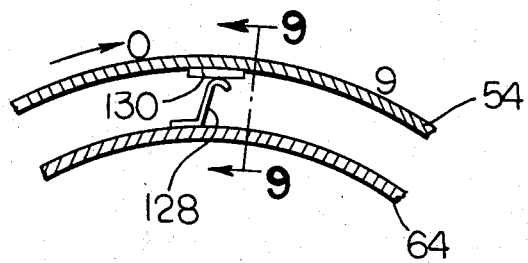
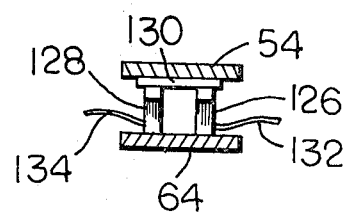
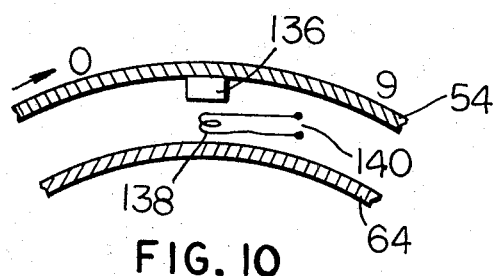
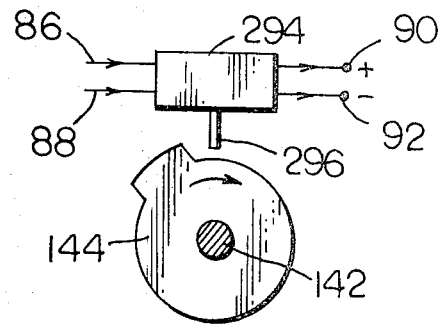
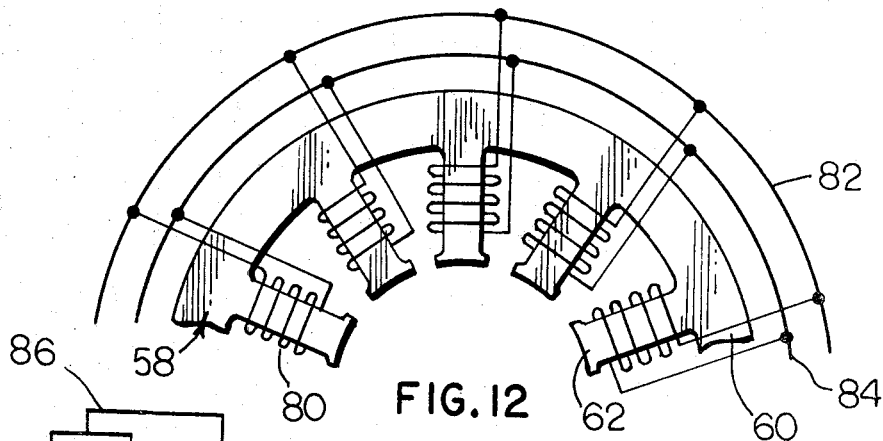
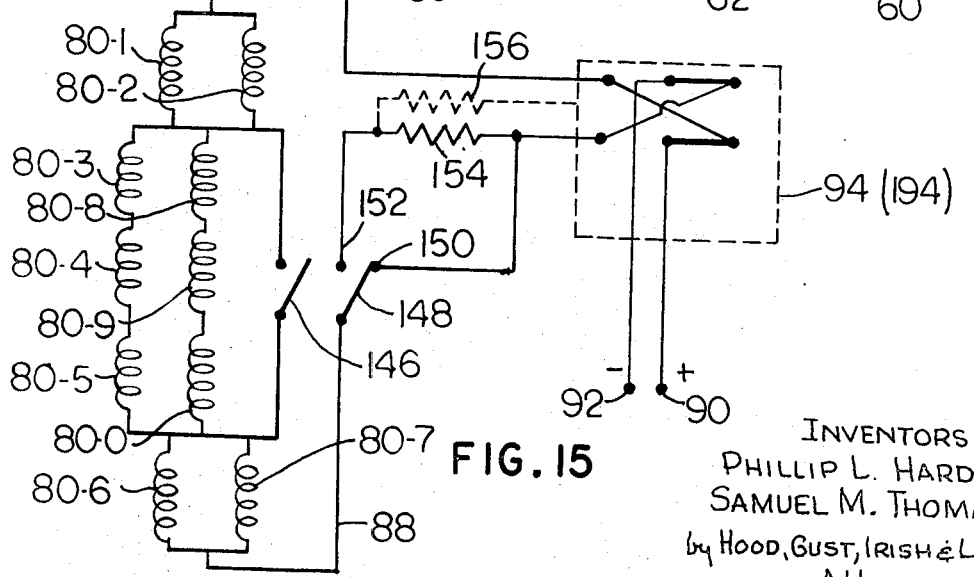

Dec. 8, 1970    P. L. HARDEN ET AL    3,546,673
ELECTROMAGNETIC COUNTING APPARATUS
Filed Dec. 30, 1968    6 Sheets-Sheet 6

INVENTORS
PHILLIP L. HARDEN
SAMUEL M. THOMAS JR.
by Hood, Gust, Irish & Lundy
Attorneys United States Patent Office 3,546,673
Patented Dec. 8, 1970

3,546,673
ELECTROMAGNETIC COUNTING APPARATUS
Phillip L. Harden and Samuel M. Thomas, Jr., Fort Wayne, Ind., assignors to Bowmar Instrument Corporation, Fort Wayne, Ind., a corporation of Indiana
Filed Dec. 30, 1968, Ser. No. 787,937
Int. Cl. H01r 13/50
U.S. Cl. 340—168    24 Claims

ABSTRACT OF THE DISCLOSURE

Electromagnetic counting apparatus for counting events, such as pulses of a pulse train or revolutions of a shaft. A first permanent magnet stepping motor is provided with its rotor having a plurality of discrete positions corresponding to a first order of the number to be counted, the motor being advanced one step in the same direction to the next adjacent position in response to the occurrence of each such event. Advance of the rotor from one predetermined step to the next adjacent step indicating completion of the first order count is sensed and a second similar permanent magnet stepping motor has its rotor advanced one step in response thereto thereby providing a second order count. Each of the stepping motors has only two external leads with a one step advance of the rotor being provided in response to each reversal of the polarity of a direct current voltage applied across two leads.

BACKGROUND OF THE INVENTION

Field of the invention

This invention relates generally to electromagnetic stepping motor apparatus, and to counting apparatus incorporating such stepping motor apparatus.

Description of the prior art

Numerous types of electromagnetic rotary positioning indicator devices have been proposed, those disclosed in Pat. No. 3,371,333 to Arthur F. Naylor, and assigned to the assignee of the present application, and in Pat. No. 3,376,569 to John A. Watkins, being typical. All of these devices employ a magnetic stator structure having a plurality of field windings thereon and a radially polarized permanent magnetic rotor member, the windings being variously energized in various combinations in accordance with a prearranged code so as selectively to position the permanent rotor in a plurality of different discrete rotational positions. In Pat. No. 3,416,015 to Arthur F. Ordas, also assigned to the assignee of the present application, there is disclosed a permanent magnet rotor member for use with electromagnetic rotary position indicator devices having projections formed thereon offset from the magnetic axis which provide a detent action so as to permit 180° rotation of the rotor member.

SUMMARY OF THE INVENTION

In accordance with the present invention, apparatus of the electromagnetic indicating type is provided with the windings connected and arranged so that each successive reversal of the direction of current flow in the respective windings is accompanied by a one-step rotational advance of the permanent magnet rotor member in the same direction from one position to the next adjacent position, thus providing a stepping motor which may be employed for counting purposes. In order to count to a number having an order higher than the number of discrete rotational positions of the rotor member, a plurality of such stepping motors may be employed, each such motor employed for counting a lower order having means for sensing advance of the rotor from a predetermined position to the next adjacent position which thus indicates completion of a lower order count. The next higher order stepping motor is then connected for actuation by the sensing means of the next lower order stepping motor.

In accordance with the broad aspects of the invention, there is provided electromagnetic stepping motor apparatus having first and second concentric relatively rotatable magnetic members, the first member having means for simultaneously forming an even number of first discrete magnetic polar areas thereon with adjacent areas having opposite polarities, respectively, and the second member having means for simultaneously forming an even number of second discrete magnetic polar areas thereon with adjacent areas likewise having opposite polarities, respectively. One of the members is rotatable and has a plurality of discrete rotational positions relative to the other member respectively corresponding to the highest number of the first and second areas, a pair of the polar areas of the opposite polarity of the rotatable member being magnetically aligned with a different pair of the polar areas of corresponding opposite polarity of the other member in each of the rotational positions. Means are provided for simultaneously reversing the polarities of all of the polar areas of a predetermined one of the members so that the rotatable member is rotated relative to the other member from one position to the next adjacent position. Detent means is provided for permitting rotation of the rotatable member relative to the other member in only one direction so that the rotatable member advances one step in the same direction to the next adjacent position in response to each successive polarity reversal.

It is accordingly an object of the invention to provide improved electromagnetic stepping motor apparatus.

Another object of the invention is to provide improved electromagnetic stepping motor apparatus having only two external leads.

A further object of the invention is to provide improved electromagnetic counting apparatus incorporating electromagnetic stepping motor devices for each order of counting.

The above-mentioned and other features and objects of this invention and the manner of attaining them will become more apparent and the invention itself will be best understood by reference to the following description of an embodiment of the invention taken in conjunction with the accompanying drawings, wherein:

BRIEF DESCRIPTION OF THE DRAWINGS

FIG. 6 is a block diagram schematically illustrating use of the stepping motor devices of the invention in a counter;

FIG. 7 is a timing diagram useful in explaining the operation of the system of FIG. 6;

FIG. 8 is a fragmentary cross-sectional view showing another embodiment of the count completion sensing means of the invention;

FIG. 9 is a fragmentary cross-sectional view taken generally along the line 9—9 of FIG. 8;

FIG. 10 is a fragmentary cross-sectional view illustrating another embodiment of the count completion sensing means of the invention;

FIG. 11 is a fragmentary view showing means for actuating the stepping motor device of the invention in response to the revolutions of a rotating shaft;

FIG. 12 is a fragmentary schematic view showing another coil arrangement;

FIG. 15 is a schematic view further showing the system of FIG. 14.

DESCRIPTION OF THE PREFERRED EMBODIMENTS

Figure 1:
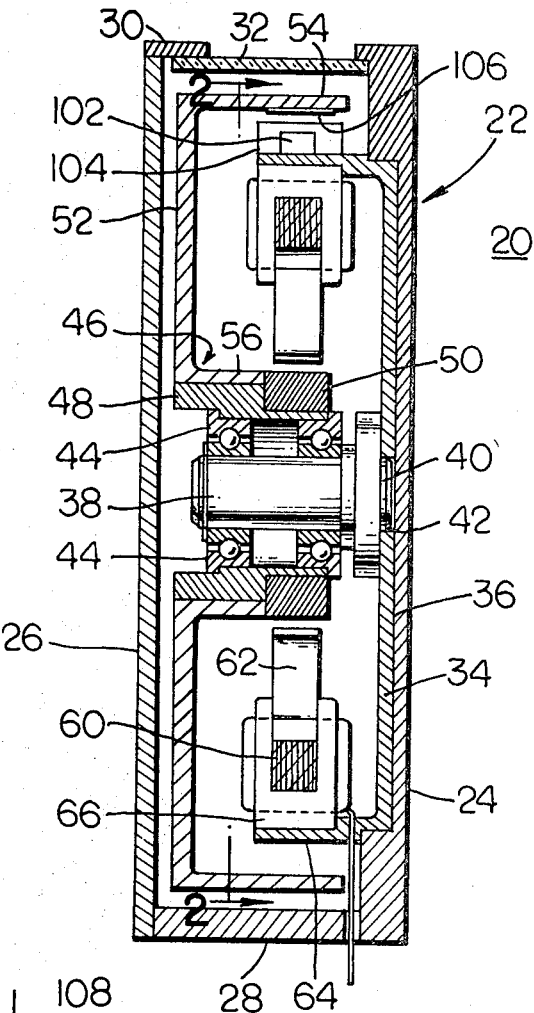
FIG. 1 is a cross-sectional view showing electromagnetic stepping motor apparatus incorporating one embodiment of the invention.

Referring now to FIGS. 1 through 5 of the drawings, the improved stepping motor apparatus of the invention, generally indicated at 20, comprises housing 22 having spaced-apart side walls 24, 26, bottom wall 28, and top wall 30, and having a window 32 therein for viewing indicia which are displayed.

An annular cup-shaped member 34 is seated in a recess 36 formed in the inner surface of side wall 24. Stationary shaft 38 has its end 40 seated in opening 42 in cup-shaped member 34 and secured thereto. Suitable anti-friction bearings 44 are positioned on shaft 38 and rotatably support rotor assembly 46 thereon.

Rotor assembly 46 comprises annular sleeve member 48 mounted on bearings 44 and having annular permanent magnet rotor member 50 secured thereto. Indicator drum 52 is provided having an outer cylindrical drum portion 54 and an inner annular flange portion 56 mounted on sleeve member 48, permanent magnet 50, sleeve member 48 and indicator drum 52 thus rotating as a unit on bearings 44. The outer peripheral surface of drum portion 54 carries the indicia which are viewed through window 32.

Stator core structure 58 is provided, conventionally formed of a stacked plurality of relatively thin laminations of magnetic material, or alternatively conventionally formed of sintered material. Stator core structure 58 comprises an annular yoke portion 60 having a plurality of equally angularly spaced polar projections or teeth 62 extending radially inwardly therefrom. Stator core structure 58 is mounted in annular flange portion 64 of cup-shaped member 34 by a plurality of C-shaped insulators 66 which embrace yoke portion 60 and extend downwardly on each face of each tooth 62. Insulators 66 thus not only support and locate stator core structure 58 within annular flange portion 64, but also separate the field coils to be hereinafter described. The inner ends 68 of the teeth 62 define a bore for receiving the permanent magnet rotor member 50. In the illustrated embodiment, core structure 58 is provided with ten teeth 62, each adjacent pair of teeth defining a slot 70 therebetween.

In the illustrated embodiment, the permanent magnet rotor member 50 is of the type described and illustrated in the aforesaid Pat. No. 3,416,015 of Arthur F. Ordas. Thus, rotor member 50 is provided with a pair of diametrically opposite projections 72 having their axis indicated by the dashed line 73, angularly displaced from the magnetic axis of the permanent magnet, as indicated by the dashed line 74. Projections 72 respectively define smaller air gaps with the inner ends 68 of a respective diametrically opposite pair of teeth 62 than are defined by the inner ends of the remaining teeth with the remaining portions of the peripheral surface of the permanent magnet 50. Thus, when the field windings are energized, as will hereinafter be described, the rotor 50 will be positioned with its magnetic axis 74 aligned with a diametrically opposite pair of teeth 62. However, when the field excitation is removed, as further described in the aforesaid Ordas patent, by reason of the lower reluctance provided by the smaller air gaps 76, the permanent magnet rotor member 50 will rotate slightly in the direction shown by arrow 78 so axis 73 of projection 72 is aligned with the same diametrically opposite pair of stator teeth.

Figure 2:
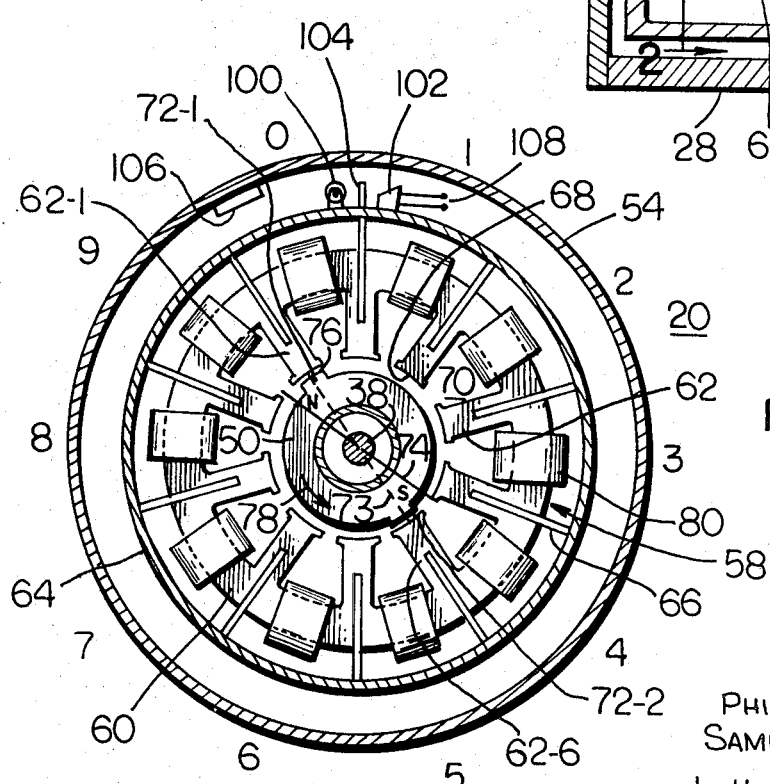
FIG. 2 is a cross-sectional view taken generally along the line 2—2 of FIG. 1.

In the illustrated embodiment, the indicator drum 54 has numerals zero to nine sequentially displayed thereon, as schematically shown in FIG. 2, the numeral one being displayed through the window 32 in the position shown in FIG. 2.

Figure 3:
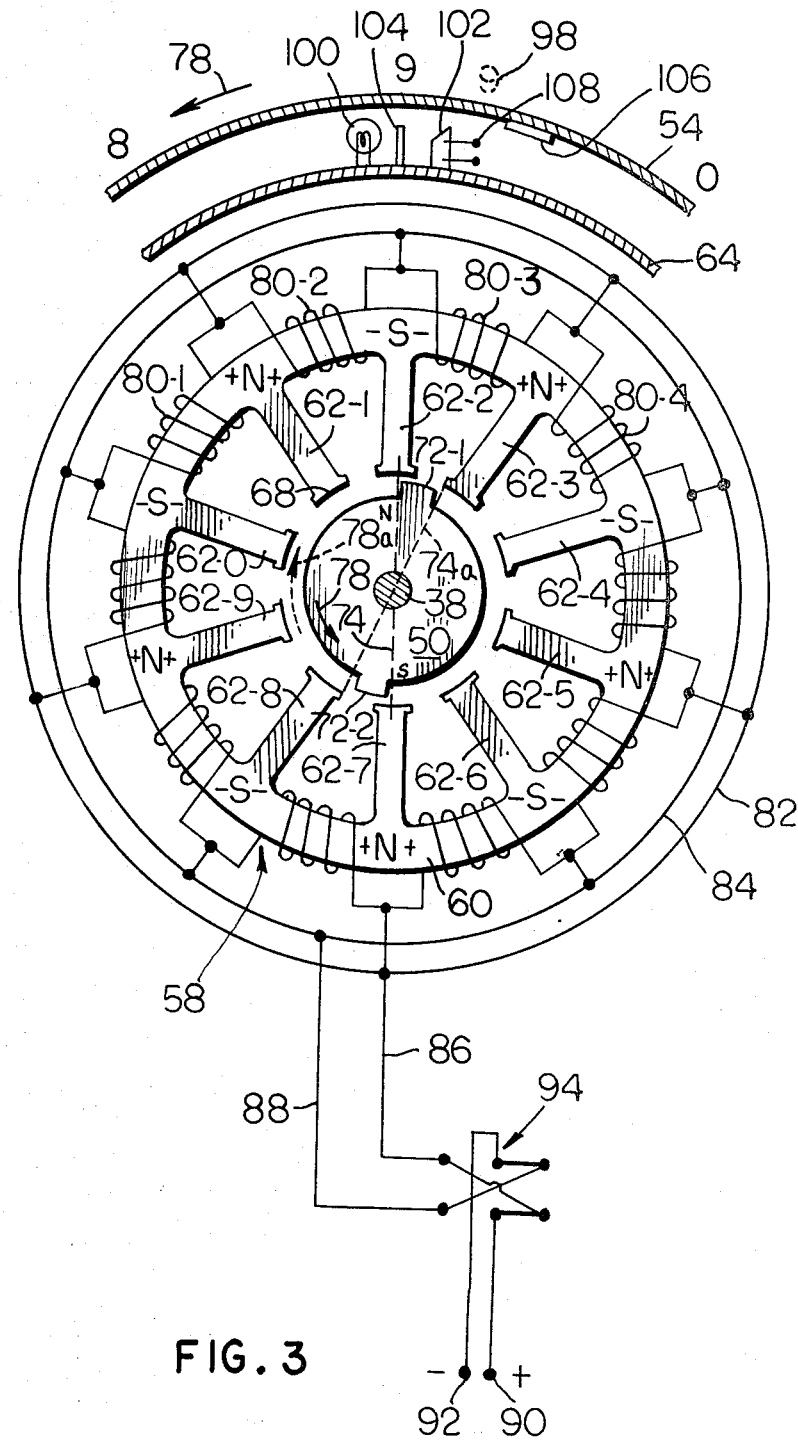
FIG. 3 is a fragmentary schematic view illustrating the connection and arrangement of the coils of the stepping motor of FIGS. 1 and 2, and further illustrating one embodiment of the count completion sensing means of the invention.

In the illustrated embodiment, ten field coils 80 are provided respectively positioned on the yoke portion 60 of stator core 58, each coil 80 being positioned between a respective adjacent pair of teeth 62. Referring particularly to FIG. 3, each coil 80 is wound in toroidal fashion on yoke portion 60 in the same sense, the coils being respectively connected in parallel across two common leads 82 and 84. Further, the coils are respectively connected so that with the leads 82, 84 connected to a direct current potential source of given polarity, mmfs. of opposite polarity are provided in adjacent teeth 62.

Common leads 82, 84 are respectively connected to external leads 86, 88 which are coupled to positive and negative terminals 90, 92 of a suitable source of direct current potential, such as +5 volts by a conventional polarity reversing switch 94. It will thus be seen that with the switch 94 in the position shown in which common lead 82 is connected to the positive side of the source and common lead 84 to the negative side, coils 80–1 and 80–2 are respectively energized so that the inner end 68 of tooth 62–1 is polarized "North," coils 80–2 and 80–3 are energized so that the inner end of tooth 62–2 is polarized "South," coils 80–3 and 80–4 are energized so that the inner end of tooth 62–3 is polarized "North," and the remaining adjacent coils 80 are energized so that the inner ends of the successive teeth 62 surrounding the stator core 58 are alternately polarized as shown.

Assuming momentarily that switch 94 had previously been in the opposite position, i.e. so that lead 82 was connected to the negative side 92 of the source and lead 84 was connected to the positive side 90, tooth 62–3 would have been polarized "South" and tooth 62–8 would have been polarized "North" thus causing magnetic axis 74 of permanent magnet rotor 50 to be in alignment with the diametrically opposite teeth 62–3 and 62–8 thus displaying the numeral eight.

Assuming further that the switch 94 was then opened, so that external leads 86, 88 were not connected to the source thereby to de-energize all of the coils 80, the permanent magnet rotor member 50 would then rotate in the direction shown by the arrow 78 an incremental amount so that the projections 72–1 and 72–2 were respectively aligned with the teeth 62–3, 62–8, thus displacing the display numeral eight slightly in direction 78.

Reversal of the polarilty reversing switch 94 to the position shown in FIG. 3, thus connecting external lead 86 and common lead 82 to the positive side 90 of the source and external lead 88 and common lead 84 to the negative side 92 will result in simultaneous reversal of the direction of current flow in each of the coils 80 and provision of the tooth polarities shown in FIG. 3. The diametrically opposite teeth 62–3 and 62–8 now are polarized "North" and "South," respectively, thus repelling the oppositely polarized projections 72–1 and 72–2 of permanent magnet rotor 50. By virtue of the offset or detent action above-described which advances rotor 50 slightly in direction 78 as switch 94 is reversed, projections 72–1 and 72–2 will be repelled toward and respectively attracted by the "South" and "North" teeth 62–2 and 62–7, thus advancing rotor 50 in direction 78 to position shown in FIG. 3 in which magnetic axis 74 is in alignment with the diametrically opposite teeth 62–2 and 62–7 with the numeral nine now being displayed through window 32. Opening of switch 94 will now result in further incremental advance of rotor 50 in direction 78 to displace the numeral nine to the position shown in dashed lines at 98 in FIG. 3 with projection 72–1 and 72–2 respectively in alignment with the diametrically opposite teeth 62–2 and 62–7.

It will now be seen that in each position of switch 94, adjacent teeth 62 are oppositely polarized, and that successive reversals of the switch 94 will result in rotational advance of the permanent magnet rotor member 50 in direction 78, one step at a time, so that the magnetic axis 74 is aligned with the next adjacent pair of diametrically opposite stator teeth.

Thus, each actuation of switch 94 results in a one step rotational advance of rotor member 50 and drum 54 so as to display the next numeral. It will of course be understood that if the sequence of numerals appearing on drum 54 were reversed from that shown in FIGS. 2 and 3 each successive actuation of switch 94 would result in a one-step advance of rotor member 50 to display the next numeral. Alternatively, positioning projection 72 or the other side of the magnetic axis as shown by the dashed line 74a, would result in rotational advance of rotor member 50 in the opposite direction 78a. It will now be readily understood that if switch 94 is actuated in response to the occurrence of events to be counted, as will be hereinafter more fully described, the stepping motor 20 will act as a counter either additively or subtractively counting the events depending upon the sequential arrangement of the numerals on the drum 54, or the location of the magnetic axis 74 with respect to the projection 72. It will further be understood that the requisite detent acion will be provided so long as the magnetic axis 74 is angularly displaced from axis 73 of the projection 72; axis 74 may be at an edge of, or even extend through projections 72.

In order cumulatively to count a number of events in excess of the number of numerals displaced on the drum 54 (ten in the illustrated embodiment), the arrangement now to be described is provided. A suitable light source 100, such as a light-emitting diode, is mounted on the outer periphery of annular flange 64 and a light-sensitve device 102 is similarly mounted on flange 64. A light shield 104 is disposed between light source 100 and light sensitive device 102 in order to shield direct radiation from light source 100 from impinging upon light sensitive device 102. A small reflective element 106 is mounted or formed on the inner surface of drum 54. In the illustrated embodiment, reflective surface 106 is disposed between the numerals nine and zero, as shown. Thus, in the positions of the rotor member 50 and drum 54 shown in FIGS. 2 and 3, no light will be received by light sensitive device 102 from the light source 100 and thus no signal will be provided in output circuit 108 of the light sensitive device. It will be seen however in FIG. 3 that the numeral nine is displayed, and that the next one-step advance of rotor member 50 and drum 54 in directions 78, which will result in moving the drum from the position displaying the numeral nine to the position displaying the numeral zero, will result in the reflective surface 106 being moved past light source 100 and light sensitive device 102.

Figure 4:
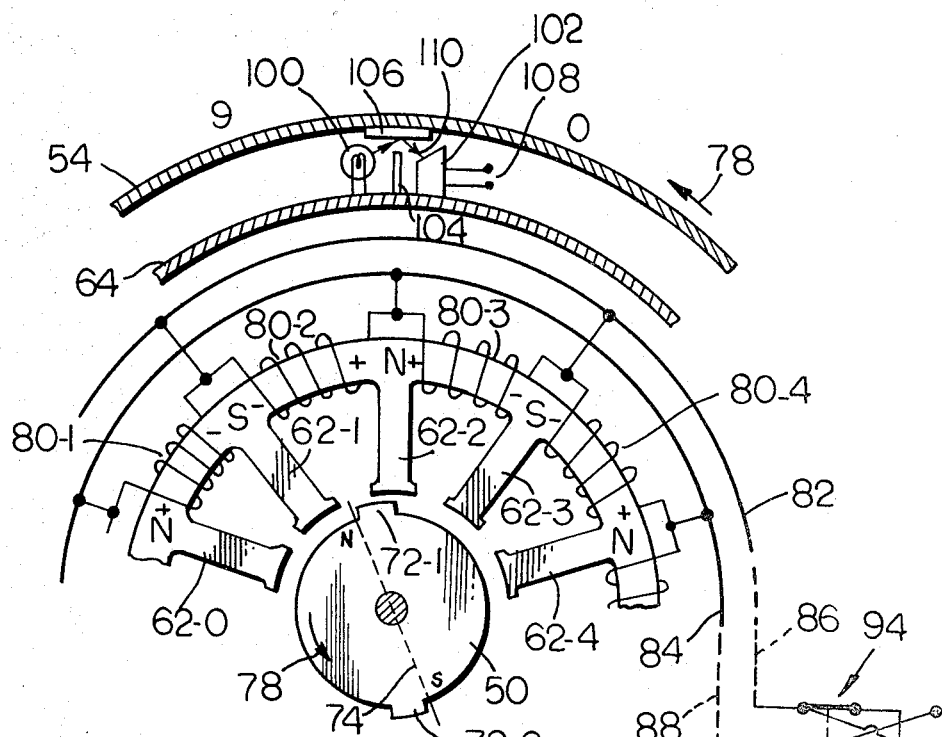
FIGS. 4 and 5 are schematic views similar to FIG. 3 useful in explaining the operation of the device of the invention.

Referring now additionally to FIG. 4, with polarity reversing switch 94 reversed from the position shown in FIG. 3, thus reversing the direction of current flow in the coils 80, the polarity of tooth 62–2 is now reversed from "South" to "North" and the polarity of tooth 62–1 is likewise reversed from "North" to "South," thus resulting in the repelling of the "North" projection 72–1 of permanent magnet rotor 50 by tooth 62–2 and its attraction by tooth 62–1 so that the rotor member 50 and drum 54 is again rotated in direction 78. In the case of an additive counting operation, advance from the numeral nine to the numeral zero indicates completion of the counting of the lower order of the number being counted. It will be seen that midway in the one-step advance of rotor member 50 and drum 54 from display of the numeral nine to display of the numeral zero, reflective surface 106 will move into cooperative relationship with light source 100 and light sensitive device 102 so that light emitted by light source 100 is reflected onto the light sensitive device 102, as shown by the dashed line 110, thus providing a momentary pulse in the output circuit 108 of light sensitive device 102.

Figure 5:
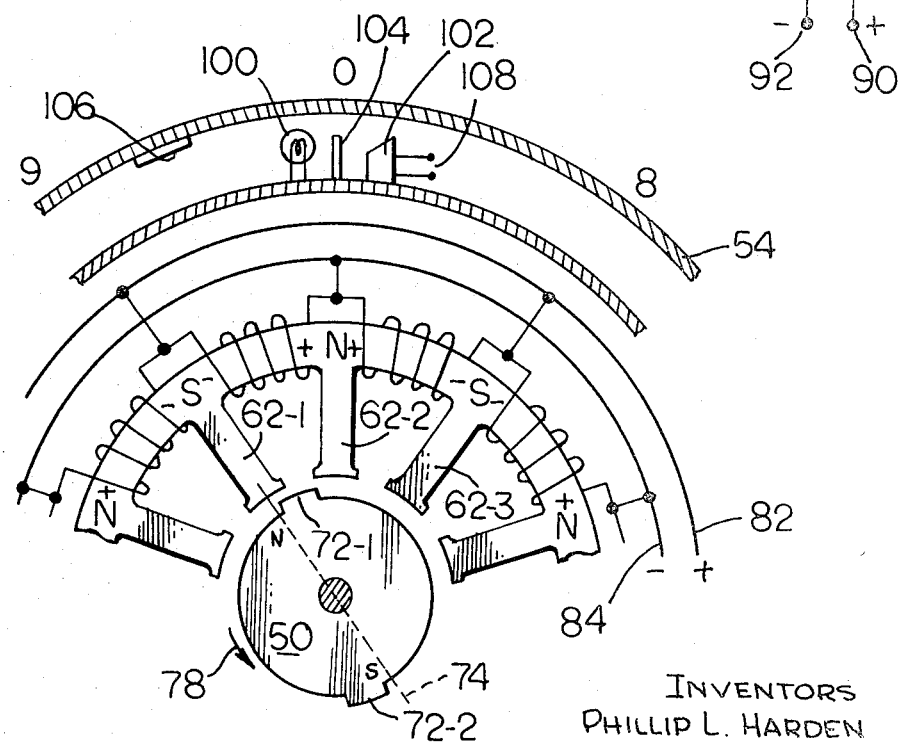

At the conclusion of the one-step advance of rotor member 50 and drum 54 from display of the numeral nine to display of the numeral zero, as above described, the magnetic axis 74 of permanent magnet rotor member 50 is now in alignment with the "South" tooth 62–3 with the numeral zero being displayed, as shown in FIG. 5, mirror 106 having moved past the mid-point so that the light-sensitive device 102 is again shielded from light source 100 by light shield 104. Opening of switch 94 will then cause the "North" projection 72–1 to align with tooth 62–3, as shown in FIG. 2.

Referring now to FIG. 6, a counting system, generally identified at 112 is shown for counting a train of electrical pulses 114. Counting system 112 comprises a first or units stepping motor 20–1 as described above and illustrated in FIGS. 1 through 5, and a second or tens stepping motor or counter 20–2, likewise as shown in FIGS. 1 through 5 and described above. In this embodiment, the polarity reversing switch 94 takes the form of a conventional bistable multivibrator or flip-flop 194–1 having its plus or "one" and negative or "zero" output circuits respectively connected to external leads 86 and 88 of the units counter 20–1. Input circuit 116 which receives the train of pulses 114 to be counted is preferably connected to a conventional monostable multivibrator 118 which generates longer pulses for actuating the flip-flop 194–1 respectively in response to the narrow input pulses 114. It will be readily understood that the monostable multivibrator 118 may not be necessary if the input pulses 114 have a longer duration. The output circuit of monostable multivibrator 118–1 is coupled to the input circuit 120 of flip-flop 194–1.

Output circuit 108–1 of the light sensitive device 102 is coupled to the input circuit of another monostable multivibrator 118–2 which has its output circuit coupled to the input circuit 120–2 of a second flip-flop 194–2. Flip-flop 194–2 has its "one" and "zero" output circuits respectively coupled to the external leads 86 and 88 of the tens counter 20–2. It will be readily understood that the output circuit 108–2 of the light sensitive device 102 of the tens counter 20–2 in turn may be coupled to a still higher order counter.

Referring now to FIG. 7, a train of twenty input pulses 114 is shown at A and the corresponding pulses provided by monostable multivibrator 118–1 are shown at 120 at B. The "one" and "zero" outputs of the flip-flop 190–1 applied to the external leads 86 and 88 of units counter 20–1 are shown at C and D, it being readily understood that the signals applied to the leads 86 and 88 by the flip-flop 194–1 correspond to the potentials applied by the manually actuated polarity reversing switch 94 shown in FIGS. 3 and 4. It will thus be seen that the occurrence of each successive input pulse 114 will result in advance of the permanent magnet rotor 50 and drums 54 of the units counter 20–1 by one step.

Upon the occurrence of the tenth input pulse 114 which initiates the corresponding advance of the permanent magnet rotor 50 and drum 54 as above-described, movement of the reflective surface 106 past light source 100 and light sensitive device 102 will result in generation of transfer pulse 122–1 as shown at E in FIG. 7. Transfer pulse 122–1 applied to monostable multivibrator 118–2 will result in generation of pulse 124–1 applied to flip-flop 194–2 resulting in the "one" and "zero" signals applied to external leads 86, 88 of tens counter 20–2 as shown at G and H in FIG. 7. It will now be seen that the occurrence of each transfer pulse 124–1 will be accompanied by actuation of flip-flop 194-2 to reverse the direction of current flow in the coils 80 of the tens counter 20-2 thus resulting in a one-step advance of permanent magnet 50 in drum 54 of the tens counter to display the next higher numeral of the second order. It will be understood that the transition of the flip-flops 194-1 and 194-2 provides the requisite short deenergized interval for the above-described detent action to take place so that rotational advance in the desired direction is assured.

Referring now to FIGS. 8 and 9 in which like elements are indicated by like reference numerals, the sensing of the advance of the permanent magnet rotor 50 and drum 54 from its predetermined position, such as that displaying the numeral nine to the next adjacent position in which the numeral "zero" is displayed, in order to provide the transfer pulse 124, may be provided by means of cooperating stationary contacts 126 and 128 mounted on the flange portion 64 and a bridging contact 130 mounted on the drum 54. It will be readily understood that movement of the bridging contact 130 into the position shown in FIGS. 8 and 9 to bridge the stationary contacts 126, 128 will provide the momentary transfer pulse 122 in leads 132 and 134 which connect the stationary contacts in a signal circuit.

Referring now to FIG. 10 in which like elements are still indicated by like reference numerals, sensing of the advance of permanent magnet rotor member 50 and drum 54 to provide the transfer pulse 124 may be provided by a conventional magnetic pick-up comprising a permanent magnet 136 carried by the drum 54 and a cooperating pick-up coil 138 mounted on the flange portion 64, the transfer pulse 122 thus being generated in the output circuit 140 of pick-up coil 138 responsive to movement of the permanent magnet slug 136 past the pick-up coil 138.

Referring now to FIG. 11, polarity reversing switch 94 may take the form of a conventional snap-acting switch 294 having an actuating button 296, it being understood that each actuation of the button 296 will result in reversal of the connection of the external leads 86, 88 to the positive and negative terminals 90, 92 of the source. Thus, in order to count the number of revolutions of a shaft 142, a suitable cam 144 is mounted on shaft 142 which thus actuates button 296 once each revolution of the shaft thereby to effect the polarity reversal.

Referring now to FIG. 12 in which like elements are still indicated by like reference numerals, it will be readily understood that the coils 80 may be disposed upon the teeth 62 of the stator structure 58 rather than upon the yoke portion 60 between the teeth.

Figure 13:
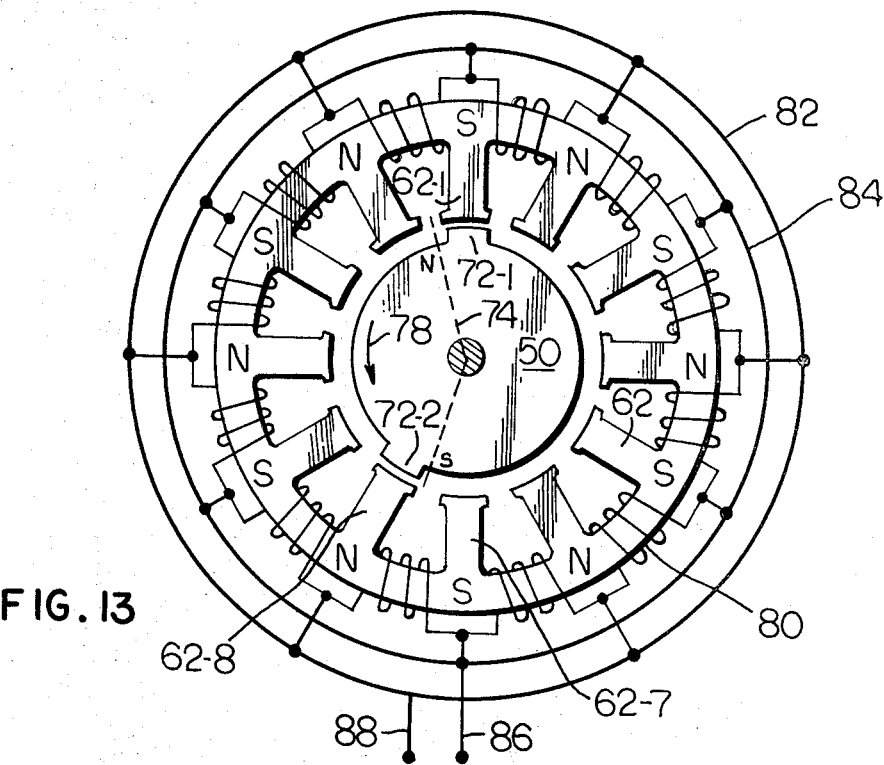
FIG. 13 is a schematic view showing a twelve pole version of the stepping motor apparatus of the invention.

Referring now to FIG. 13, in which like elements are again indicated by like reference numerals, here, the stator core member 58 is shown as having twelve teeth 62. It will thus be seen that for each polarity of the potential coupled to the external leads 86, 88 by the reversing switch 94, diametrically opposite teeth, such as the teeth 62-1 and 62-7 will have the same polarity. Since it is required that the projections 72-1 and 72-2 be respectively aligned with an oppositely polarized pair of stator core teeth 62, it is necessary that the projections 72-1 and 72-2 of the permanent magnet rotor member 50 be displaced by one tooth from the diametrically opposite position, as shown, and that the magnetic orientation 74 likewise be so displaced. Thus, in this twelve tooth embodiment, in the deenergized position shown in FIG. 13, the "North" projection 72-1 is aligned with the "South" tooth 62-1 and the "South" projection 72-2 is aligned with the "North" tooth 62-8.

Figure 14:
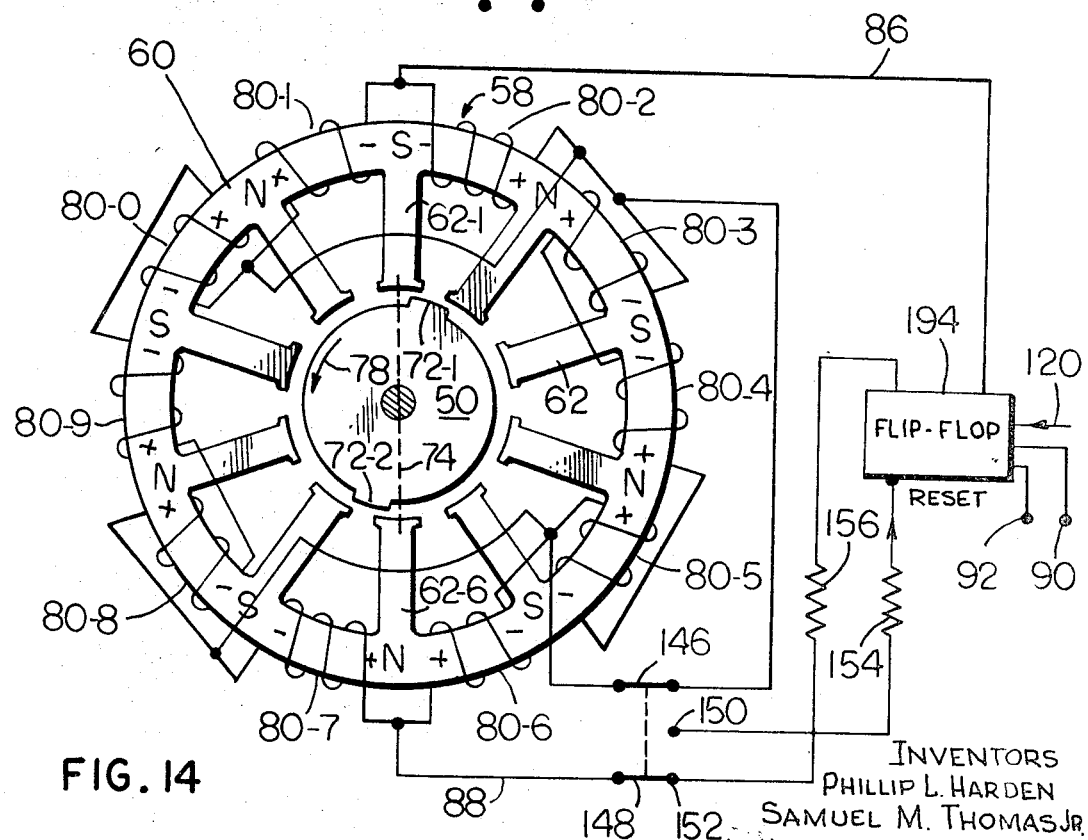
FIG. 14 is a schematic view showing circuitry for resetting the stepping motor apparatus to a predetermined reference position.

In most counter applications, it is desirable to provide means for directly resetting the counter to the "zero" position without the necessity for operating the counter upwardly or downwardly, as the case may be, through all of the remaining numerals of the count until zero is reached. Referring now to FIGS. 14 and 15 in which like elements are still indicated by like reference numerals, here, the "zero" or reference position of the permanent magnet rotor member 50 and drum 54 (not shown in FIG. 14) is that shown in FIG. 14 with magnetic axis 74 in alignment with the diametrically opposite teeth 62-1 and 62-6 of the ten pole version shown. In order to provide the zero reset, coils 80-1 and 80-2 respectively disposed on either side of the tooth 62-1 and coils 80-6 and 80-7 respectively on opposite sides of the tooth 62-6 are respectively connected in parallel and respectively connected to the external leads 86 and 88. The remaining coils 80-3, 80-4 and 80-5 are connected in series-parallel relationship with coils 80-8, 80-9 and 80-0, the series parallel connection of those coils being connected in series with the parallel-connected coils 80-1, 80-2 and 80-6, 80-7 as clearly shown schematically in FIG. 15. A short circuiting switch 146 is provided for short circuiting the intermediate coils 80-3, 80-4, 80-5 and 80-8, 80-9 and 80-0, switch 146 being ganged with two pole switch 148. Switch 148 in its position 150, in which switch 146 is open, directly connects external leads 88 to the polarity reversing switch 94. In its other position 152, in which switch 146 is closed to short circuit the intermediate coils, switch 148 connects lead 88 to reversing switch 94 through compensating resistor 156 which inserts in series with the coils 80-1, 80-2, 80-6 and 80-7 substantially the same resistance as that otherwise provided by the short circuited coils.

It will now be seen that with switch 148 in its position 152 and switch 146 closed, the intermediate coils 80-3, 80-4, 80-5, 80-8, 80-9, and 80-0 are short circuited and thus rendered ineffective, only the coils 80-1, 80-2, 80-6 and 80-7 being energized thereby exciting the teeth 26-1 and 26-6 only so as to return the permanent magnet rotor member 50 from whatever position it may be in to its zero position as shown in FIG. 14. When a flip-flop 194 is employed as the polarity reversing switch, it is also necessary to reset the flip-flop to its state or condition for advancing from the "zero" to the "one" position, and thus, another resistor 154 is provided coupling switch position 152 to the "reset" input circuit of the flip-flop.

While there have been described above the principles of this invention in connection with specific apparatus, it is to be clearly understood that this description is made only by way of example and not as a limitation to the scope of the invention.

What is claimed is:

1. Electromagnetic stepping motor apparatus comprising: first and second concentric, relatively rotatable magnetic members, said first member having means for simultaneously forming an even number of first discrete magnetic polar areas thereon with adjacent areas having opposite polarities, respectively, said second member having means for simultaneously forming an even number of second discrete magnetic polar areas thereon with adjacent areas having opposite polarities, respectively, one of said members being rotatable and having a plurality of discrete rotational positions relative to the other member respectively corresponding to the highest number of said first and second areas, a pair of said polar areas of opposite polarity of said rotatable member being magnetically aligned with a different pair of said polar areas of corresponding opposite polarity of the other member in each of said positions, means for simultaneously reversing the polarities of all of the polar areas of a predetermined one of said members whereby said rotatable member is rotated relative to the other member from one position to the next adjacent position, and detent means for permitting rotation of said rotatable member relative to the other member in only one direction whereby said rotatable member advances one step in the same direction to the next adjacent position in response to each successive said polarity reversal.

2. The apparatus of claim 1 wherein said polar area forming means of said predetermined one member comprises field winding means and circuit means for simultaneously energizing the same with unidirectional current, and said reversing means comprises switching means for simultaneously reversing the direction of current flow in said winding means.

3. The apparatus of claim 2 wherein said polar area forming means of said predetermined one member further comprises polar projections extending toward the other member, and said polar area forming means of the other member comprises permanent magnet means.

4. The apparatus of claim 1 further comprising means for sensing rotational advance of said rotatable member from a predetermined one of said positions to the next adjacent position.

5. The apparatus of claim 4 further comprising means coupled to said sensing means and responsive thereto for counting each said advance of said rotatable member.

6. The apparatus of claim 4 wherein said sensing means comprises means for emitting light and light sensitive means disposed to receive light therefrom when said rotatable member is at a position between said predetermined and next adjacent positions.

7. The apparatus of claim 4 wherein said sensing means comprises means mounted on one of said members for emitting light, light sensitive means mounted on the same member as said light emitting means for providing a signal in response to impingement of light thereon, and light reflecting means mounted on the other of said members for reflecting light from said light emitting means onto said light sensitive means when said rotatable member is at a position intermediate said predetermined and next adjacent positions.

8. The apparatus of claim 7 further comprising means for shielding said light sensitive means from direct radiation of light from said light emitting means.

9. The apparatus of claim 4 wherein said sensing means comprises cooperating contact means on said members for completing an electrical circuit in response to said advance of said rotatable member.

10. The apparatus of claim 4 wherein said sensing means comprises cooperating magnetic pick-up means on said members for providing an electrical signal in response to said advance of said rotatable member.

11. The apparatus of claim 1 wherein said first member is a rotor member and said second member is a stator member, said first polar area forming means comprising a permanent magnet polarized to have a pair of oppositely polarized polar areas at its outer periphery; said second polar areas forming means comprising a stator core member having a yoke portion and an even number of spaced tooth portions extending radially inwardly therefrom with their inner ends defining a bore for receiving said rotor member, the number of said tooth portions corresponding to the number of said rotational positions of said motor member, field winding means on said core, and circuit means for coupling said winding means for energization by unidirectional current, said winding means and circuit means being arranged so that said winding means provides oppositely polarized mmfs. in adjacent tooth portions thereby providing said oppositely polarized areas at said inner ends thereof, said reversing means comprising switching means for simultaneously reversing the direction of current flow in said winding means.

12. The apparatus of claim 11 wherein said winding means comprises an even number of coils equal in number to said tooth portions.

13. The apparatus of claim 12 wherein said coils are positioned on said yoke portion respectively intermediate said tooth portions.

14. The apparatus of claim 12 wherein said coils are respectively positioned on said tooth portions.

15. The apparatus of claim 12 wherein said circuit means couples all of said coils for simultaneous energization by a source of said current, said switching means selectively reversing the polarity of said source.

16. The apparatus of claim 11 wherein said detent means comprises means for advancing said rotatable members in said direction by an incremental amount less than a said step in response to interruption of said current flow in said winding means.

17. The apparatus of claim 11 wherein said polar areas of said permanent magnet define a first air gap with said inner ends of said tooth portions, said detent means comprising a pair of projections on said permanent magnet respectively adjacent said polar areas thereof and defining a second air gap narrower than said first air gap.

18. The apparatus of claim 1 wherein said rotatable member has dial means connected thereto and rotatable therewith for indicating the position thereof.

19. The apparatus of claim 1 wherein said polar area forming means of said predetermined one member comprises field winding means and circuit means for simultaneously energizing the same with unidirectional current, said reversing means comprising switching means for simultaneously reversing the direction of current flow in said winding means, and further comprising means for actuating said switching means in response to the occurrence of events to be counted whereby said rotatable member is advanced one said step in response to each actuation of said switching means thereby counting said events.

20. The apparatus of claim 19 further comprising means for sensing advance of said rotatable member from a predetermined one of said positions to the next adjacent position thereby indicating completion of counting of a first order of a number of said events; second stepping motor apparatus as herein set forth, and means for coupling the switching means of said second stepping motor apparatus to said sensing means for actuation thereby whereby said rotatable member of said second stepping motor apparatus is advanced one step in response to each completion of a said first order count to provide a second order count.

21. The apparatus of claim 1 further comprising means for selectively returning said rotatable member to a predetermined reference position from any position rotationally removed therefrom.

22. The apparatus of claim 21 wherein said one predetermined member is a stator member, the other member being the rotatable member, said polar area forming means of said stator member comprising a plurality of field coils equal in number to the polar areas thereof, the number of polar areas of said stator member being said highest number, said rotatable member having two only polar areas, circuit means for simultaneously energizing all of said coils with unidirectional current, said reversing means comprising first switching means for simultaneously reversing the direction of current flow in each of said coils, said returning means comprising second switching means for rendering some of said coils ineffective with the remaining coils being energized so as to return said rotatable member to said reference position.

23. Counting apparatus comprising a first electromagnetic stepping motor having rotor and stator members, said rotor member having a plurality of discrete rotational positions corresponding to the first order of the highest number to be counted, means for rotationally advancing said rotor member one step in the same direction from one position to the next adjacent position in response to the occurrence of each event to be counted, means for sensing advance of said rotor member from one predetermined position to the next adjacent position thereby to indicate completion of a first order count; a second electromagnetic stepping motor having second rotor and stator members, said second rotor member having a plurality of discrete rotational positions corresponding to the second order of said number, and means coupled to said sensing means for rotationally advancing said second rotor member one step in the same direction from one position to the next adjacent position in response to said advance of said first-named rotor member from said one predetermined position to the next adjacent position.

24. The apparatus of claim 23 wherein said advancing means of said first stepping motor comprises field winding means on the stator member thereof, circuit means comprising two only electrical leads for coupling said winding means to a source of unidirectional current for energization thereby, and means for reversing the polarity of said source in response to each said event; and wherein said advancing means of said second stepping motor comprises second field winding means on the stator member thereof, second circuit means for coupling said second winding means to a source of unidirectional current for energization thereby, and means for reversing the polarity of said last-named source in response to said sensing means.

References Cited

UNITED STATES PATENTS

| | | | |
|---|---|---|---|
| 3,174,088 | 3/1965 | Muller | 318—138 |
| 3,257,594 | 6/1966 | Weigel | 318—138 |
| 3,344,325 | 9/1967 | Sklaroff | 318—138 |
| 3,403,272 | 9/1968 | Dold | 318—138X |

RALPH D. BLAKESLEE, Primary Examiner

U.S. Cl. X.R.

310—49; 318—138